(12) United States Patent
Lu

(10) Patent No.: US 8,101,282 B2
(45) Date of Patent: Jan. 24, 2012

(54) DIFFUSERS AND METHODS OF MANUFACTURE

(76) Inventor: Zhijian Lu, Belle Mead, NJ (US)

( * ) Notice: Subject to any disclaimer, the term of this patent is extended or adjusted under 35 U.S.C. 154(b) by 252 days.

(21) Appl. No.: 12/127,272

(22) Filed: May 27, 2008

(65) Prior Publication Data

US 2009/0226628 A1    Sep. 10, 2009

Related U.S. Application Data

(62) Division of application No. 11/439,437, filed on May 24, 2006.

(51) Int. Cl.
*B05D 5/02* (2006.01)
(52) U.S. Cl. ......... 428/510; 427/508; 427/514; 427/517
(58) Field of Classification Search .................. 427/510, 427/508, 514, 517
See application file for complete search history.

(56) References Cited

U.S. PATENT DOCUMENTS

| | | | |
|---|---|---|---|
| 3,307,943 A * | 3/1967 | Heiart | 430/254 |
| 3,866,313 A * | 2/1975 | Yih | 29/592.1 |
| 5,462,700 A | 10/1995 | Beeson et al. | |
| 5,496,497 A * | 3/1996 | Takiguchi et al. | 252/299.01 |
| 5,521,726 A | 5/1996 | Zimmerman | |
| 5,600,455 A | 2/1997 | Ishikawa et al. | |
| 5,914,825 A | 6/1999 | Nishio et al. | |
| 6,275,338 B1 | 8/2001 | Arai et al. | |
| 6,628,355 B1 * | 9/2003 | Takahara | 349/106 |
| 6,859,326 B2 | 2/2005 | Sales | |
| 7,037,573 B2 | 5/2006 | Miyatake | |
| 7,090,389 B2 | 8/2006 | Parker et al. | |
| 7,220,026 B2 | 5/2007 | Ko et al. | |
| 7,230,764 B2 | 6/2007 | Mullen et al. | |
| 7,232,250 B2 | 6/2007 | Chuang | |
| 7,316,498 B2 | 1/2008 | Olczak | |
| 7,380,970 B2 | 6/2008 | Hwang et al. | |
| 7,401,967 B2 | 7/2008 | Wei et al. | |
| 7,618,164 B2 | 11/2009 | Wang et al. | |
| 7,670,726 B2 | 3/2010 | Lu | |
| 2001/0019748 A1 * | 9/2001 | Beeson et al. | 428/14 |
| 2004/0263061 A1 | 12/2004 | Ishikawa et al. | |
| 2006/0061869 A1 | 3/2006 | Fadel et al. | |

(Continued)

FOREIGN PATENT DOCUMENTS

JP    08146207 A    6/1996

(Continued)

OTHER PUBLICATIONS

Sartomer Company, Inc; Product Bulletin SR-9003; Dec. 1998; Exton, PA.
Sartomer Company, Inc; Product Bulletin CD9038; Dec. 2001; Exton, PA.
Sartomer Company, Inc; Product Bulletin SR-499; May 1999; Exton, PA.

(Continued)

*Primary Examiner* — Elena T Lightfoot

(57) ABSTRACT

Diffusers including of a plurality of protruded structures with each structure containing multiple rugged facets are disclosed. The diffuser may be fabricated by coating a mixture of materials on a carrier film, the mixture of materials including at least a first material that polymerizes upon irradiation and at least a second material that is incompatible with the first material in polymerized form, then selectively irradiating the mixture of materials to polymerize a portion of the mixture of materials to form polymerized structures, and finally removing that part of the mixture of materials not forming part of the structures. A transparent material may be coated over the structures. The overcoat material may further contain scattering elements such as glass beads or polymeric particles.

16 Claims, 10 Drawing Sheets

U.S. PATENT DOCUMENTS

| | | |
|---|---|---|
| 2006/0126185 A1 | 6/2006 | Oh et al. |
| 2007/0247562 A1 | 10/2007 | Shim et al. |
| 2007/0263412 A1 | 11/2007 | Lee |
| 2007/0275215 A1 | 11/2007 | Lu |
| 2008/0101759 A1 | 5/2008 | Lee |
| 2009/0067155 A1 | 3/2009 | Olczak et al. |

FOREIGN PATENT DOCUMENTS

| | | |
|---|---|---|
| JP | 10096804 A | 4/1998 |
| JP | 11-199798 | 7/1999 |

OTHER PUBLICATIONS

Sartomer Company, Inc; Product Bulletin SR-349; Jan. 1999; Exton, PA.

Sartomer Company, Inc; Product Bulletin SR-601; Aug. 2003; Exton, PA.

Fouassier, J.P.; Radiation Curing in Polymer Science and Technology, p. 270, 1993.

* cited by examiner

DIFFUSERS AND METHODS OF MANUFACTURE

RELATED APPLICATIONS

This application is a divisional application of pending U.S. patent application Ser. No. 11/439,437, filed 24 May, 2006, the contents of which are incorporated herein by reference in its entirety.

FIELD OF THE INVENTION

The present invention relates generally to diffusers and their methods of manufacture, and more particularly, diffusers including a plurality of structures with each structure having faceted surfaces.

BACKGROUND

Diffusers are included in numerous devices including liquid crystal displays, rear projection display and other devices. These diffusers may be surface diffusers or bulk diffusers. The surface diffusers use surface topography and the differences in refractive indices to scatter light. Unfortunately surface diffusers typically scatter light over a narrow range of angles and may not scatter the light uniformly. The bulk diffusers use embedded elements such as glass beads or polymeric particles to scatter light. Unfortunately, the scattering provided by bulk diffusers results in backscattering that increases as the scattering angle of the bulk diffuser is increased. This backscattering reduces light throughput which is disadvantageous. Accordingly, there is a strong need in the art for diffusers that uniformly scatter light over a wide range of angles while maintaining good light throughput.

SUMMARY OF THE INVENTION

An aspect of the present invention is to provide a diffuser including a plurality of structures, each of the structures having multiple facets. The facets may have rugged surfaces.

Another aspect of the present invention is to provide method of forming a diffuser including forming a plurality of structures and forming multiple facets on each of the structures. The forming multiple facets may or may not be performed by two incompatible materials phase separating.

Another aspect of the present invention is to provide a method of making a diffuser including coating a mixture of materials on a carrier film, the mixture of materials including at least a first material that polymerizes upon irradiation and at least a second material that phase separates from the at least a first material when the at least a first material polymerizes, selectively irradiating the mixture of materials to polymerize a portion of the mixture of materials to form polymerized structures, and removing that part of the mixture of materials not forming part of the structures.

Another aspect of the present invention is to provide a diffuser including a plurality of structures, each of the structures having a plurality of facets. The plurality of structures are formed from at least one polymerized material and at least one other material that has phase separated from the at least one polymerized material.

Another aspect of the present invention is to provide a diffuser including a substrate and a plurality of polymeric structures. Each of the polymeric structures has multiple facets. The facets are rugged surfaces that are formed by incompatible materials phase separating during, photopolymerization which are then solvent washed to substantially remove at least one incompatible while substantially leaving at least one of the incompatible materials.

BRIEF DESCRIPTION OF THE DRAWINGS

The invention will be described in detail with reference to the following drawings in which like reference numerals refer to like elements wherein.

DETAILED DESCRIPTION

Figure 1:
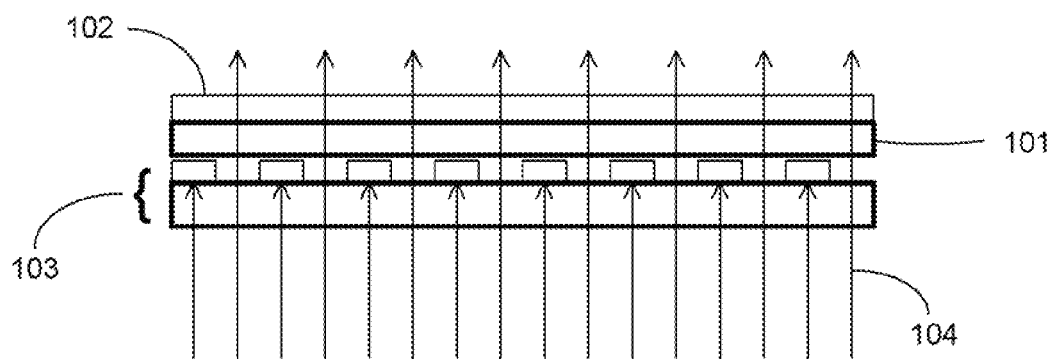
FIG. 1 illustrates irradiation of a mixture of materials to form structures.
Figure 2:
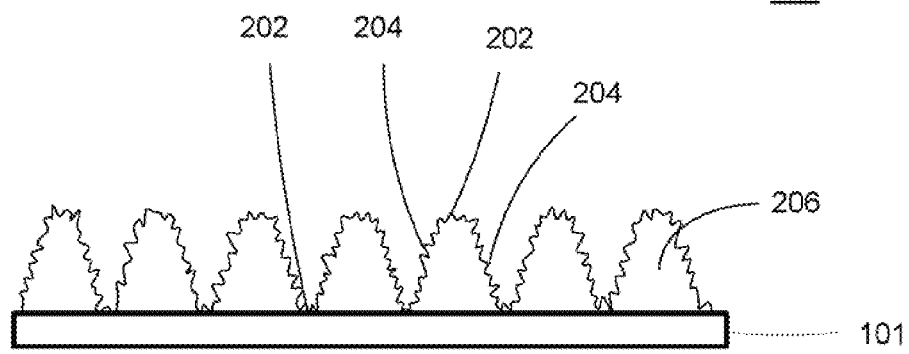
FIG. 2 illustrates an exemplary diffuser according to the present invention.

Diffusers including protruded structures with each structure including multiple facets may be used to spread light into a wide angular range. Such diffusers may include a light entrance face which in general resides on a carrier substrate or is an integrated part of a carrier substrate but has multiple light exiting facets. Surfaces of the light exiting facets may be optically rough and further induce light scattering. The facets may be planar, curved, or conic facets in shape and may be parallel with the carrier substrate, perpendicular to the carrier substrate or at any orientation in between. The facets may be continuous (e.g., circular) or discrete (e.g., hexagonal). For example, the protruded structures may be a tapered extruded hexagon with smooth base of larger surface area as light entrance face and rough base of smaller surface area as well as six rough surfaces on the side as the light exiting facets. The protruded structures also may be a tapered circular cone with smooth base of larger surface area as light entrance face and rough base of smaller surface area and the sides as light exiting facets. The protruded structures may be connected with each other, or may be separated by a space including optically rough surfaces. Light entering into such structures from the light entrance faces is scattered by the light exiting facets. The scattered light is spread into large angular range due to the multiple orientations of the light exiting facets. The diffusing effect also may be achieved in the opposite direction by inputting light from "light exiting side" of the diffuser.

An exemplary method of fabricating a diffuser according to the present invention begins with preparing a mixture of materials. The mixture of materials includes at least two components plus a photoinitiator. Alternatively, the photoinitiator may be omitted if a photopolymerizable material is used that does not require a photoinitiator. The mixture should be uniform prior to photopolymerization and should be incompatible after photopolymerization (e.g., the mixture should undergo phase separation during photopolymerization). Exemplary mixtures are listed in Table 1 below. Next, a carrier film 101, such as a PET film, a PMMA film, a PVA film or any other suitable film, is place upon a photomask 103. The photomask 103 may have any suitable configuration including one or more types of apertures that may be circular, hexagonal, octagonal where a repeated, random, or another suitable ordering of apertures is provided. For example, the photomask 103 may include hexagonal or octagonal shaped apertures. Additionally, an index matching fluid, such as isopropanol alcohol, may be applied between carrier film 101 and the photomask 103. Next, a layer 102 of the mixture of materials is coated onto the carrier film 101 through doctor blade coating, slot die coating, or any other suitable coating techniques. The thickness of the layer 102 may be between about 5 μm (0.2 mil) and about 508 μm (20 mils) with about 50.8 μm (2 mils) and about 254 μm (10 mils) being typical.

TABLE 1

| Mixture | First material | Second material | Photoinitiator |
|---|---|---|---|
| 1 | ethoxylated (3) bisphenol A diacrylate (74 w.t. %) | polythylene glycol(600) diacrylate (24 w.t. %) | benzyl dimethyl ketal (2 w.t %) |
| 2 | ethoxylated (3) bisphenol A diacrylate (53 w.t. %) | polythylene glycol(600) diacrylate (45 w.t. %) | benzyl dimethyl ketal (2 w.t. %) |
| 3 | propoxylated(2) neopentyl glycol diacrylate (78 w.t %) | phenyl salicylate (21 w.t %) | 4-methylbenzophenone, trimethyl benzophenone (1 w.t. %) |
| 4 | propoxylated(2) neopentyl glycol diacrylate (78 w.t %) | phenyl benzoate (21 w.t %) | 4-methylbenzophenone, trimethyl benzophenone (1 w.t. %) |
| 5 | trimethylolpropane triacrylate (56 w.t %) | 4'-pentyl-4-biphenylcarbonitrile (43 w.t. %) | benzyl dimethyl ketal (1 w.t %) |
| 6 | 2(2-Ethoxyethoxy) ethyl acrylate (67 w.t. %) | Polystyrene (32 w.t. %) | benzyl dimethyl ketal (1 w.t %) |
| 7 | trimethylolpropane triacrylate (76 w.t %) | bisphenol A diglycidyl ether (22 w.t. %) | benzyl dimethyl ketal (2 w.t %) |
| 8 | epoxy acrylate (61 w.t. %) | polythylene glycol(600) diacrylate (37 w.t. %) | benzyl dimethyl ketal (2 w.t %) | w.t. % is weight percent

Next, as is illustrated in FIG. 1, a collimated or nearly collimated UV or visible light 104 passes through the opening of the photomask 103 and selectively polymerizes the layer 102. The collimated or nearly collimated UV or visible light 104 cause a first material in the layer 102 to polymerize and form solid structure. A second material of the layer 102 is substantially different from the first material and phase separates from the first material during the irradiation of the collimated or nearly collimated UV or visible light 104. The second material may be unpolymerizable material or material that does not polymerize from the collimated or nearly collimated UV or visible light 104. For example, the second material could be a thermally polymerizable material (e.g., a thermopolymer) or any other polymerizable material that does not polymerize as a result of irradiation of the collimated or nearly collimated UV or visible light 104. If the second material is polymerizable, this material may be polymerized after the removal of the unexposed areas of the layer 102. The second material also may be a polymerizable material that polymerizes from the irradiation of UV or visible light. For example, the second material may polymerize at the same or a substantially different rate from that of the first material under the irradiation of UV or visible light and is incompatible with first material after polymerization.

Next the selectively polymerized layer 102 is washed with solvent (e.g., methanol, acetone, water, isopropanol or any other suitable solvent or solvents) such that unexposed areas of the layer 102 are removed. Additionally, the second material in the exposed areas of the layer 102 that are located at a boundary between an exposed area and an unexposed area are also removed because it is not fully surrounded by polymerized first material. This creates a light diffusing protruded structure 206 with rugged pitted surfaces instead of smooth surfaces on the facets of the protruded structure 206. A plurality of these structures 206 forms an excellent diffuser having a wide range of light diffusion angles. Similarly structured diffusers may be fabricated using other fabrication methods. Such similarly structured diffusers may be made from phase separated materials, may be made from non-phase separated materials or may be a single material.

The protruded structure 206 has rugged pitied surfaces that provide multiple light scattering facets on each structure 206. Some of these light scattering facets are parallel facets 202 while others are inclined facets 204. The parallel facets 202 are generally parallel to the carrier film 101 while the inclined facets 204 form an angle with carrier film 101 between 0 and 90 degrees. However, the random nature and small size of phase separation helps ensure a wide variation of facets which in turn helps ensure a wide angle of light distribution. Additionally, by controlling the relative amounts of the first and second material in the mixture, the relative amount of photoinitiator and/or the irradiation of the layer 102, the character (e.g., size, density, shape) of the surfaces of the structure 206 may be selected. The ability to determine the character of the surfaces allows one to select the angular light distribution characteristics of the resultant structures 206.

Figure 3:
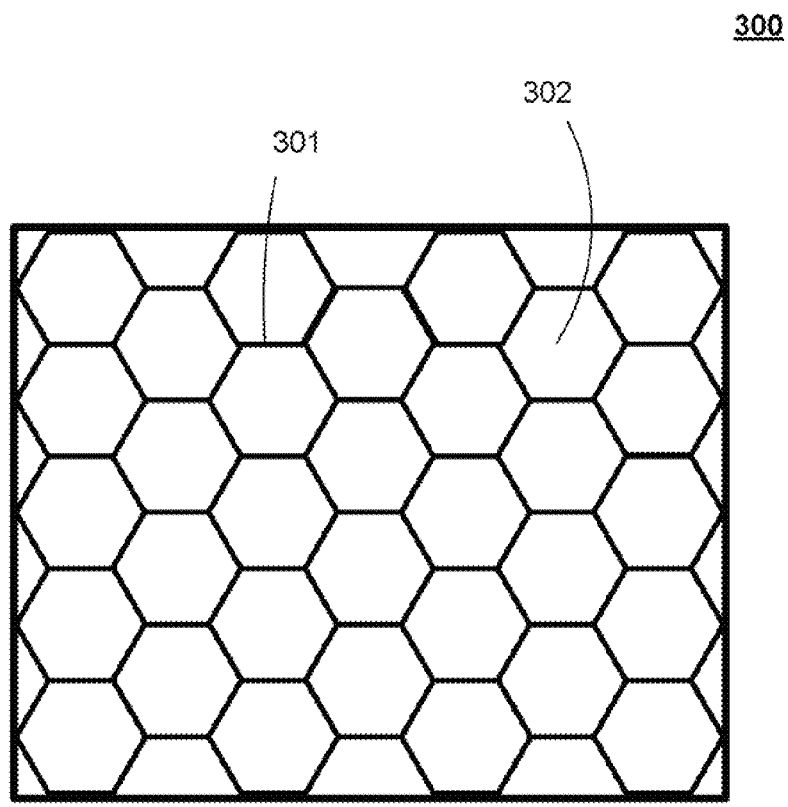
FIG. 3 illustrates an exemplary photomask pattern having a single repeated shape.

FIG. 3 illustrates an exemplary photomask pattern 300 having a single repeat shape. The photomask pattern 300 includes opaque parts 301 and empty or transparent parts 302.

Figure 4:
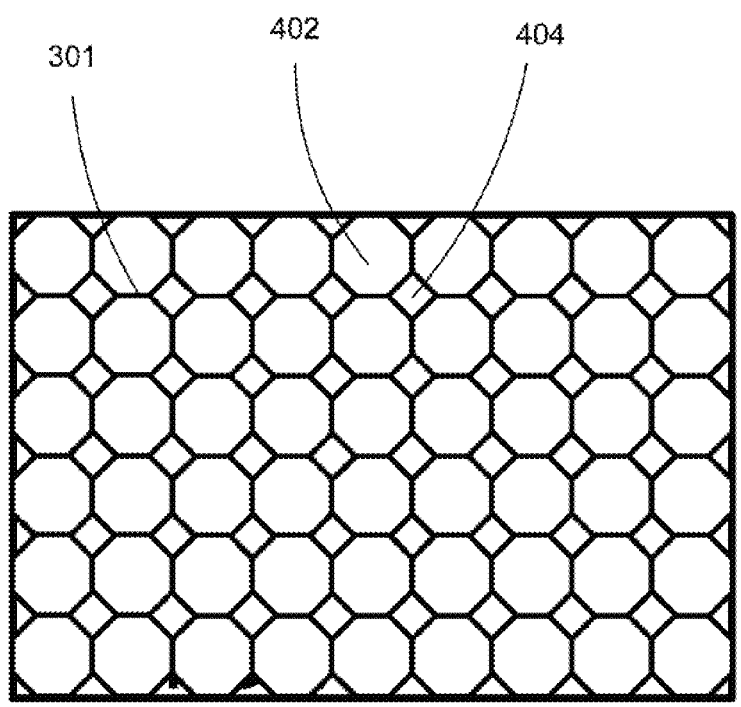
FIG. 4 illustrates another exemplary photomask pattern where two shapes are defined.

FIG. 4 illustrates another exemplary photomask pattern 400 where two shapes are defined. Larger empty or transparent parts 402 result in a larger structure being formed while smaller empty or transparent parts 404 result in a smaller structure being formed.

Figure 5:
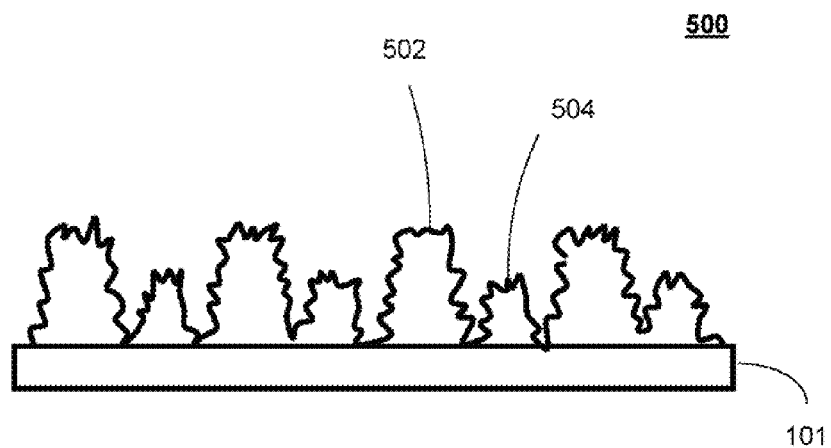
FIG. 5 illustrates a diffuser from the photomask pattern illustrated in FIG. 4.

FIG. 5 illustrates a diffuser 500 from photomask pattern 400 illustrated in FIG. 4. The larger structure 502 results from the larger empty or transparent parts 402 while the smaller structure 504 results from the smaller empty or transparent parts 404.

Figure 6:
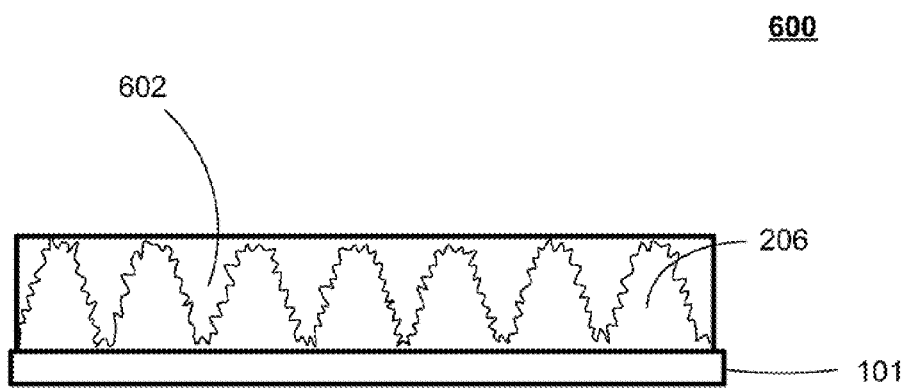
FIG. 6 illustrates another exemplary diffuser that includes structures having a transparent material overcoat.

FIG. 6 illustrates another exemplary diffuser 600 that includes structures 206 having a transparent material overcoat 602. The transparent material overcoat 602 has a different refractive index from refractive index of the structures 206. The greater the difference in refractive index, the wider the angular distribution of light. Typically, the refractive index difference is greater than about 0.005, with the refractive index difference often being greater than about 0.01. For example, the structures 206 may be made from a mixture of ethoxylated (3) bisphenol A diacrylate and polyethylene glycol (600) diacrylate and have an averaged refractive index of 1.52. The transparent material 602 may have a smaller refractive index (e.g. silicone, fluorinated acrylates or methacrylates, fluoro epoxies, fluorosilicones, or other such materials) or may have a larger refractive index (e.g., polysulfone, polyphenylsulfone, polyethersulfone, or any other suitable materials).

Figure 7:
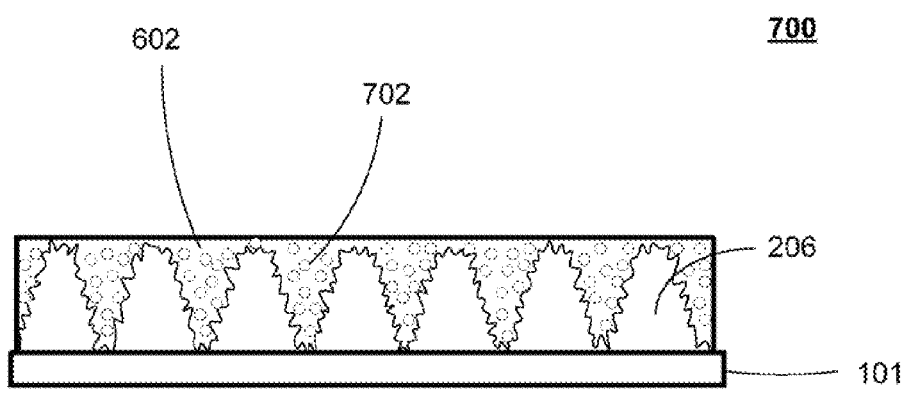
FIG. 7 illustrates another exemplary diffuser similar to the diffuser of FIG. 6 except that the transparent material overcoat also includes scattering particles.

FIG. 7 illustrates another exemplary diffuser 700 similar to the diffuser 600 of FIG. 6 except that the diffuser 700 also includes scattering particles 702 in the transparent material overcoat 602. The scattering particles 702 may be glass beads, polymer (e.g., polystyrenes, acrylics, polycarbonates, olefins, or other optically clear polymer materials) particles, or particles of any other suitable material.

Figure 8:
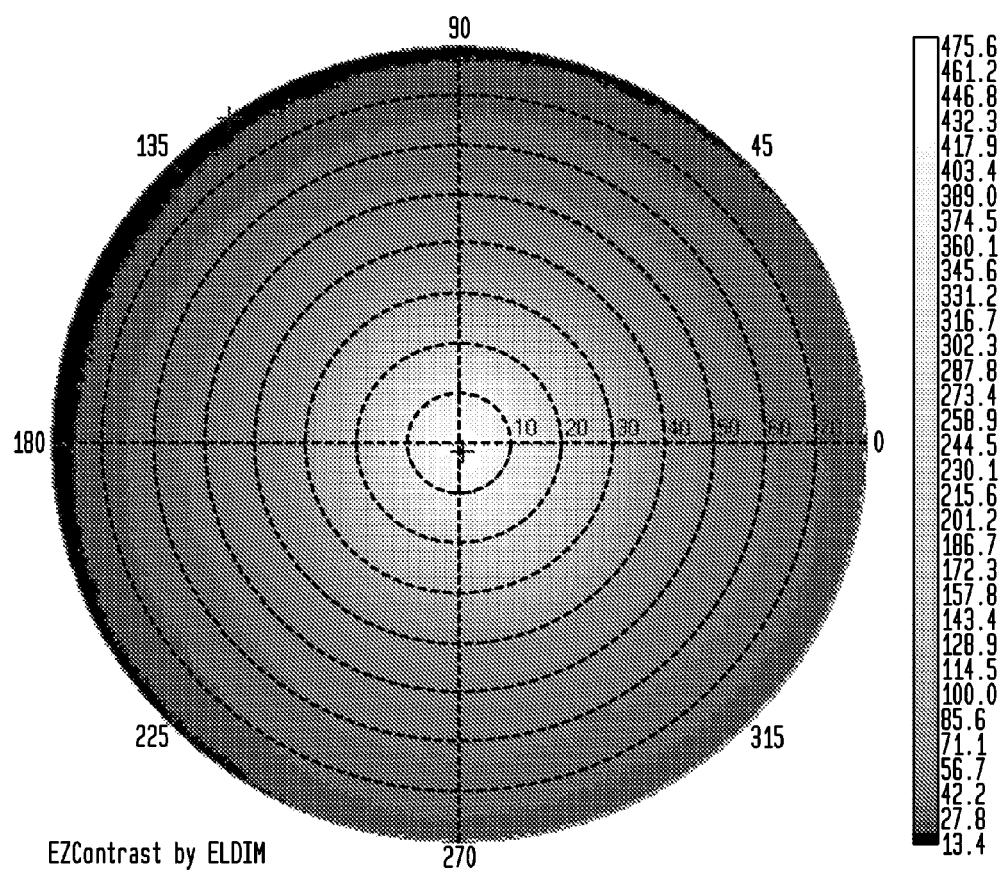
FIG. 8 is an iso-luminance plot of a diffuser according to the present invention.
Figure 9:
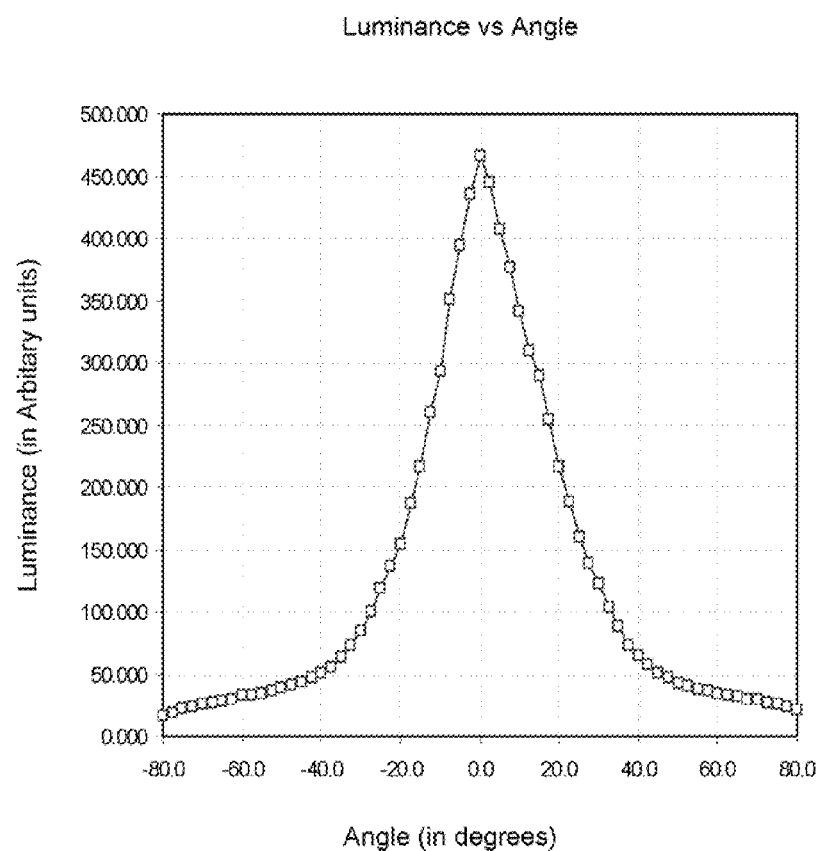
FIG. 9 is a plot of angular luminance distribution of the same diffuser as that in FIG. 8.

FIG. 8 is an iso-luminance plot of a diffuser according to the present invention. FIG. 9 is a plot of angular luminance distribution of the same diffuser measured in FIG. 8 along azimuthal angle of 45°. The diffuser thickness and the angles of half, third and tenth maximum luminance are listed in Table 2.

TABLE 2

| Diffuser Thickness | 150 μm |
|---|---|
| ½ Angle | 16.9° |
| ⅓ Angle | 23.2° |
| ⅟₁₀ Angle | 45.0° |

The mixture used to form this diffuser includes 74 w.t % of ethoxylated (3) bisphenol A diacrylate, 24 w.t. % of polyethylene glycol (600) diacrylate and 2 w.t. % of benzyl dimethyl ketal. The photomask 103 used to form this diffuser has hexagon repeat shape of side length 35.6 μm separated by 5.9 μm.

Figure 10:
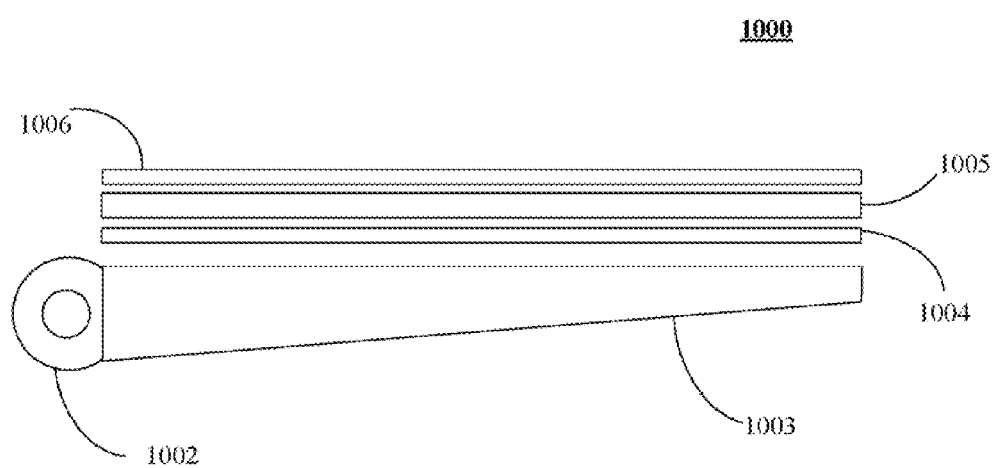
FIG. 10 illustrates an exemplary liquid crystal display backlight including a diffuser according to the present invention.

The present invention may be incorporated into various kinds of light sources and other devices. For example, FIG. 10 illustrates an exemplary liquid crystal backlight (LCD backlight) 1000 including a diffuser according to the present invention. A light source 1002 emits light along an edge of an optical waveguide plate 1003. The light source 1002 may be cold cathode fluorescent lamps, light emitting diodes or any other light source. The light from the light source 1002 is coupled into the waveguide plate 1003 and directed upwards by the waveguide plate 1003. The redirection of the light in the waveguide plate may be performed by structured bottom surface of the waveguide plate 1003, by printed scattering dots on a bottom surface of the waveguide plate 1003 or by any other means. Light coming out from a top surface of the waveguide plate 1003 typically lacks sufficient uniformity and has an undesired angular distribution. Thus, diffusers and/or other optical elements are used to improve the uniformity and reshape the angular distribution of the light. For example, a first optical diffuser 1004, a second optical diffuser 1006, and an optical film 1005 may be used. The optical film 1005 is used to further redirect light and may be a brightness enhancement film from 3M, the optical film described in U.S. patent application Ser. No. 60/677,837, which is incorporated herein by this reference, or any other suitable film. Either one or both of the first and second diffusers 1004, 1006 may be a diffuser according to the present invention. Alternative numbers and types of films may be combined with one or more diffusers according to the present invention. Alternately, one or more diffusers may be used without any additional films.

The mixture used in the layer 102 may include additional materials. For example, the first material could be a combination of two or more materials, the second material could be a combination of two or more materials, there could be two or more photoinitiators, or there could be other materials such as a dye or pigment material in the mixture. Furthermore, the mixture may be limited to inexpensive materials as opposed to expensive materials (e.g., liquid crystal materials).

FURTHER DIFFUSER EXAMPLES

Further Example 1

A mixture containing 74 w.t. % of monomer ethoxylated (3) bisphenol A diacrylate[1], 24 w.t. % of monomer polyethylene glycol (600) diacrylate[1], and 2 w.t % of photoinitiator 2,2-dimethoxy-1,2-diphenylethan-1-one (benzyl dimethyl ketal)[2] was prepared using compressed air mixer. The mixture was then degassed using ~$10^{-1}$ torr vacuum to remove air bubbles before coating. A PET substrate[3] having a 1 mil thickness was blown with ionized air to clean the PET film. Alternatively, a tacky film may be used to clean the substrate. Alternatively, substrates that are substantially transparent to UV light other than PET, such as PC, PVA, PMMA, MS or any other suitable material may be used. A thickness of about 0.5 mils to about 20.0 mils with about 1.0 to about 8.0 mils being typical may be used and the substrate may be cleaned or otherwise prepared before use. The PET film was placed on top of a photomask with isopropanol alcohol in-between as refractive index matching fluid. The mixture was coated on the PET substrate to a thickness of about 7.5 mils using doctor blade. Next ultraviolet light from a metal arc lamp having a collimation angle ~1.5° was used to illuminate the coating through the photomask. The UV dosage of 55 mJ/cm² was applied in this example. The UV exposed coating (with substrate) is then submerged in an agitated methanol bath for about 25 seconds to remove unpolymerized monomer. The substrate and the polymerized monomer are dried by blowing off any remaining solvent. Finally a post cure was performed by irradiating 500-3000 10 mJ/cm² of UV dosage.

Further Example 2

A mixture containing 49 w.t. % of monomer ethoxylated (3) bisphenol A diacrylate[1], 24.5 w.t. % of monomer ethoxylated (6) trimethylolpropane triacrylate[1], 24.5 w.t. % of metallic acrylate oligomer[1], and 2 w.t. % of photoinitiator 2,2-dimethoxy-1,2-diphenylethan-1-one (benzyl dimethyl ketal)[2] was prepared using compressed air mixer. A PET substrate[3] having a 2 mil thickness was blown with ionized air to clean the PET film. The UV dosage of 55 mJ/cm² was applied for forming the diffuser structure. The rest of fabrication is same as that described in Further Example 1.

Further Example 3

A mixture containing 24.9 w.t. % of monomer ethoxylated (3) bisphenol A diacrylate[1], 49.8 w.t. % of monomer ethoxylated (6) trimethylolpropane triacrylate[1], 24.8 w.t. % of metallic acrylate oligomer[1], and 0.5 w.t. % of photoinitiator 2,4,6-trimethylbenzoyl-diphenyl-phosphineoxide[2] was prepared using compressed air mixer. A PET substrate[3] having a 2 mil thickness was blown with ionized air to clean the PET film. The UV dosage of 105 mJ/cm$^2$ was applied for forming the diffuser structure. The rest of fabrication is same as that described in Further Example 1.

Further Example 4

A mixture containing 23.1 w.t. % of monomer ethoxylated (3) bisphenol A diacrylate[1], 45.7 w.t. % of monomer ethoxylated (6) trimethylolpropane triacrylate[1], 23.0 w.t. % of metallic acrylate oligomer[1], 7.0 w.t. % of difunctional amine coinitiator[1], 0.2 w.t. % of photoinitiator 1-hydroxy-cyclohexyl-phenyl-ketone[2] and 1.0 w.t. % of photoinitiator 2,4,6-trimethylbenzoyl-diphenyl-phosphineoxide[2] was prepared using compressed air mixer. A PET substrate[3] having a 2 mil thickness was blown with ionized air to clean the PET film. The UV dosage of 48 mJ/cm$^2$ was applied for forming the diffuser structure. The rest of fabrication is same as that described in Further Example 1.

Further Example 5

A mixture containing 25.3 w.t. % of monomer ethoxylated (4) bisphenol A diacrylate[1], 26.0 w.t. % of monomer polyethylene glycol (600) diacrylate[1], 24.8 w.t. % of metallic acrylate oligomer[1], 21.9 w.t. % of urethane acrylate[1], and 2.0 w.t. % of 2,2-dimethoxy-1,2-diphenylethan-1-one[2] was prepared using compressed air mixer. A PET substrate[3] having a 2 mil thickness was blown with ionized air to clean the PET film. The UV dosage of 55 mJ/cm$^2$ was applied for forming the diffuser structure. The rest of fabrication is same as that described in Further Example 1.

Further Example 6

A mixture containing 19.5 w.t. % of metallic acrylate ester oligomer[1], 44.0 w.t. % of low viscosity oligomer[1], 19.5 w.t. % of urethane acrylate oligomer[1], 15.0 w.t. % of monomer ethoxylated (6) trimethylolpropane triacrylate[1], and 2.0 w.t. % of 2,2-dimethoxy-1,2-diphenylethan-1-one[2] was prepared using compressed air mixer. A PET substrate having a 7 mil thickness was blown with ionized air to clean the PET film. The UV dosage of 75 mJ/cm$^2$ was applied for forming the diffuser structure. The rest of fabrication is same as that described in Further Example 1.

[1] Suitable materials may be obtained from the Sartomer Company of Exton, Pa. [2] Suitable materials may be obtained from the Ciba Specialty Chemicals of Tarrytown, N.Y. [3] Suitable substrates may be obtained from Tekra of Orange, Calif.

Figure 11:
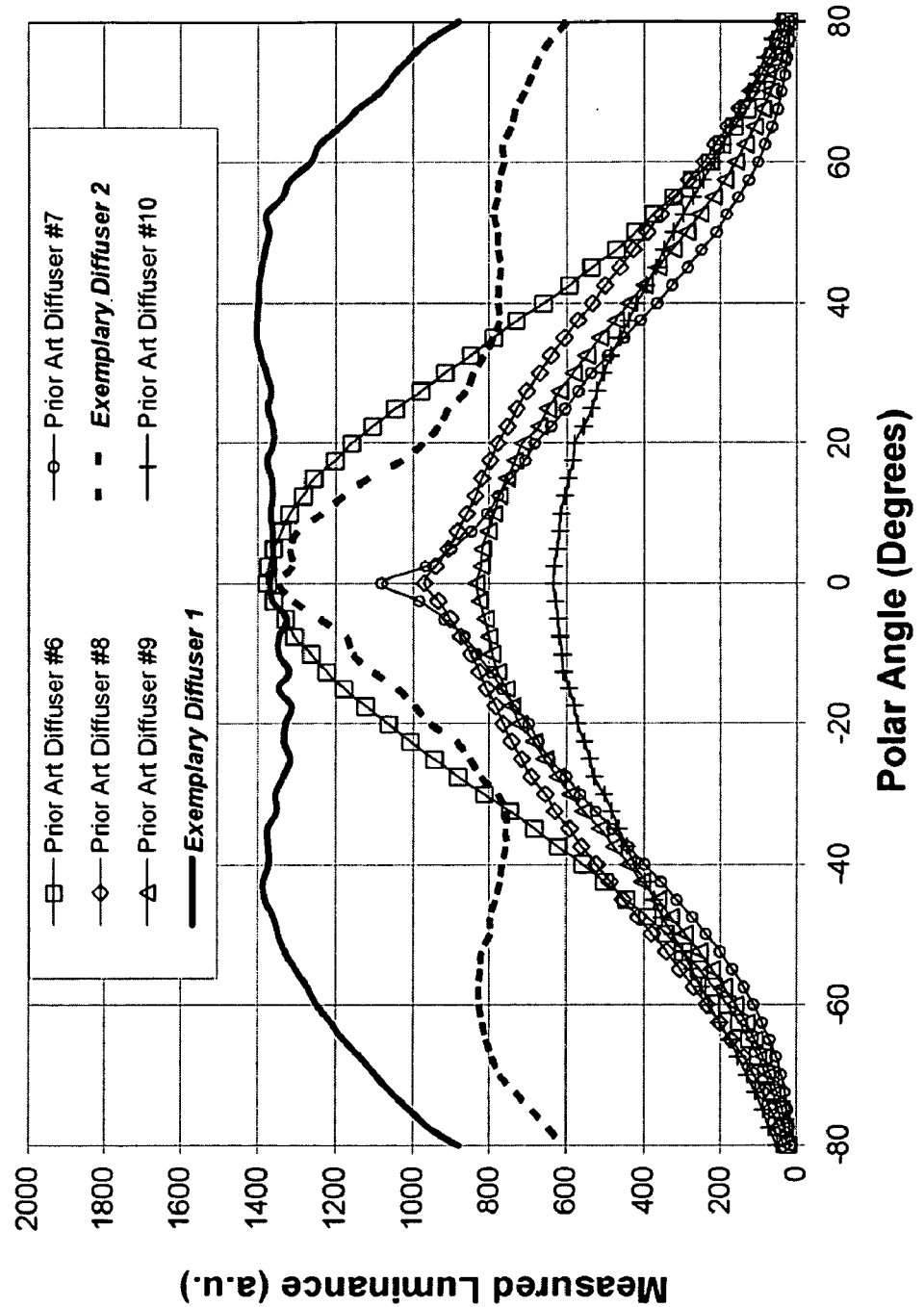
FIG. 11 is a graph of luminance verse polar angle.

FIG. 11 is a graph of luminance verse polar angle for seven diffusers. The graphs of exemplary diffuser #1 and exemplar) diffuser #2 were obtained from diffusers according to the present invention having ½ angles around 70°. Table 3 lists the diffuser thicknesses and the angles of half, third and tenth maximum luminance of five prior art diffusers and the typical performance of diffusers according to the present invention having ½ angles around 70°.

TABLE 3

Comparison of Light Throughput and Angles

| | Prior art LCD TV Diffuser #1 | Prior art LCD TV Diffuser #2 | Prior art LCD TV Diffuser #3 | Prior art LCD TV Diffuser #4 | Prior art LCD TV Diffuser #5 | Typical Exemplary Diffusers |
|---|---|---|---|---|---|---|
| Diffuser Thickness | 2 mm | 2 mm | 2 mm | 2 mm | 2 mm | 150 mm |
| ½ Angle | 35° | 42.5° | 30° | 40° | 50° | 70° |
| ⅓ Angle | 45° | 55° | 42.5° | 51° | 61° | >80° |
| 1/10 Angle | 65° | 72.5° | 60° | 68° | 78° | >80° |
| Normalized Light Throughput | 1 | 0.82 | 0.62 | 0.69 | 0.65 | 1.46* |

*Throughput normalized to Prior Art Diffuser #1

Figure 12:
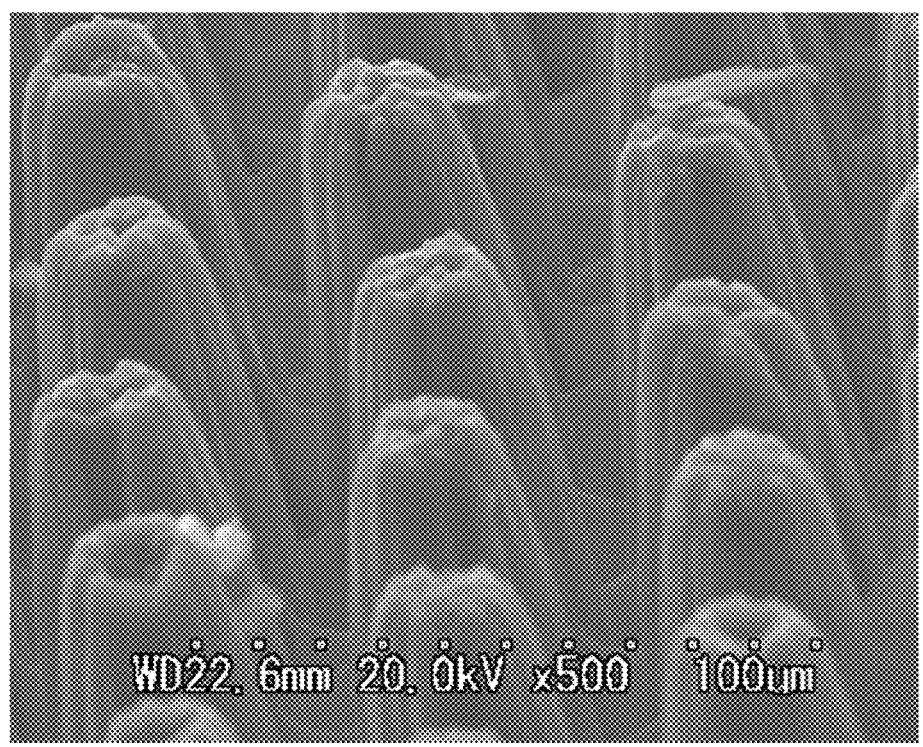
FIG. 12 shows a side view produced by a scanning electron microscope of a diffuser according to the present invention.

FIG. 12 shows a side view produced by a scanning electron microscope of a diffuser according to the present invention having ½ angles around 20° and from with a photomask having hexagonal apertures in a periodic pattern. The multiple facets of each structure corresponding to a photomask aperture are more apparent in the side view.

Figure 13:
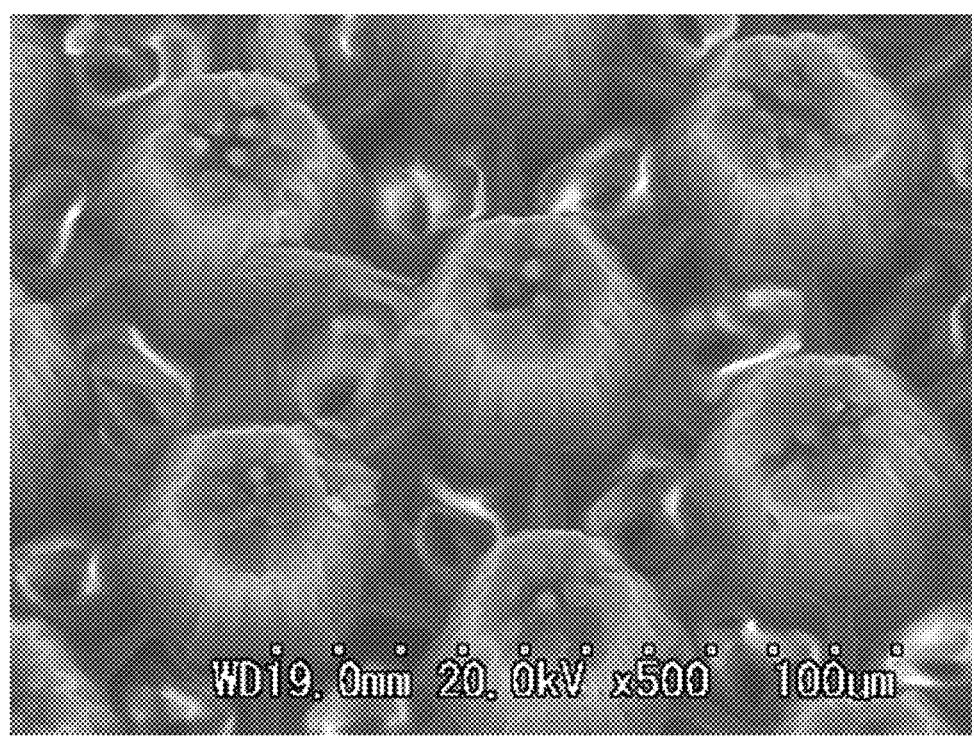
FIG. 13 shows a top view produced by a scanning electron microscope of the diffuser of FIG. 12.

FIG. 13 shows a top view produced by a scanning electron microscope of the diffuser of FIG. 12. The hexagonal shapes of each structure corresponding to a photomask aperture are more apparent this side view.

Figure 14:
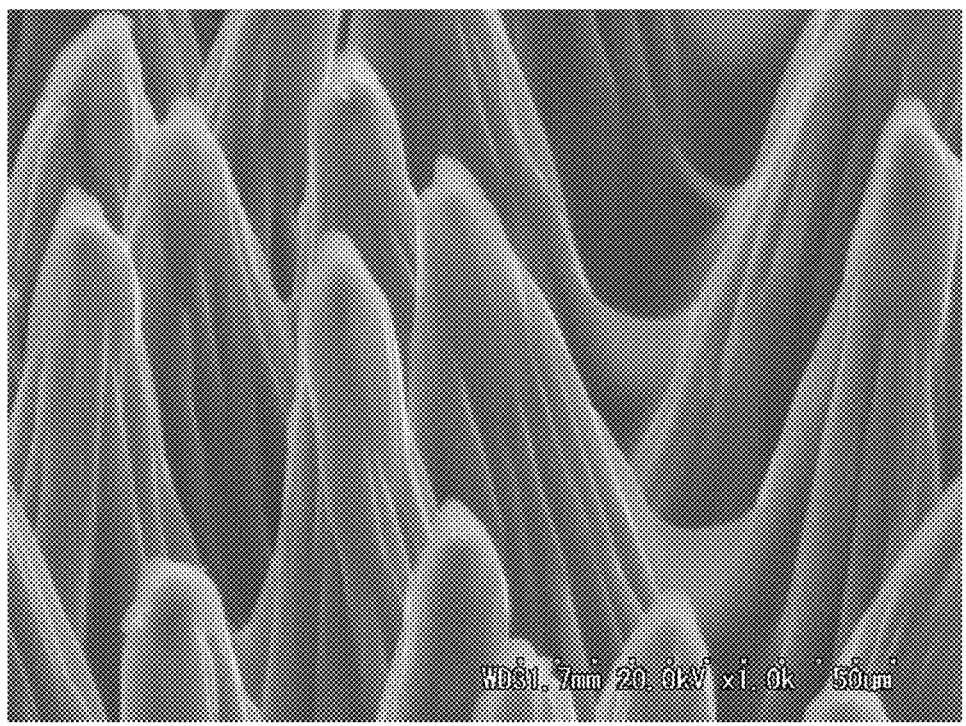
FIG. 14 shows a side view produced by a scanning electron microscope of a diffuser according to the present invention.

FIG. 14 shows a side view produced by a scanning electron microscope of a diffuser according to the present invention having ½ angles around 70° and from with a photomask having circular apertures in a random pattern.

Figure 15:
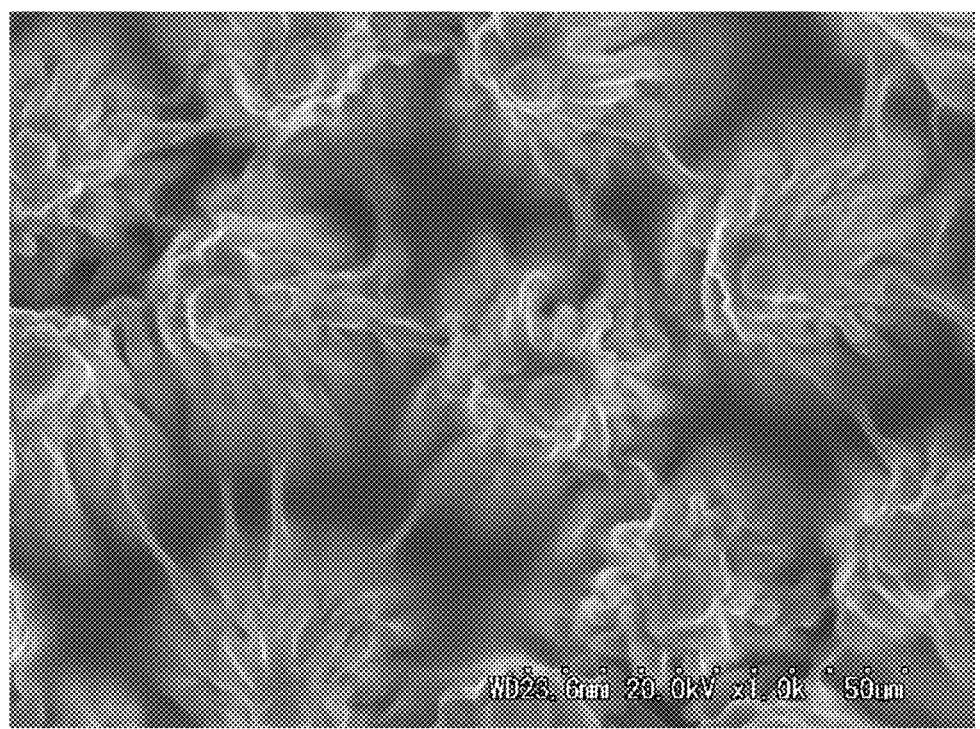
FIG. 15 shows a top view produced by a scanning electron microscope of the diffuser of FIG. 14.

FIG. 15 shows a top view produced by a scanning electron microscope of the diffuser of FIG. 14.

Although several embodiments of the present invention and its advantages have been described in detail, it should be understood that changes, substitutions, transformations, modifications, variations, permutations and alterations may be made therein without departing from the teachings of the present invention, the spirit and the scope of the invention being set forth by the appended claims.

What is claimed is:

1. A method of making a diffuser comprising:
    coating a mixture of materials on a carrier film, the mixture of materials including at least a first material that polymerizes upon irradiation and at least a non-photopolymerizable second material that phase separates from the at least first material when the at least first material polymerizes;

selectively irradiating the mixture of materials to polymerize a portion of the mixture of materials to form polymerized light diffusing protruded structures having optically rough, pitted rugged surfaces for emitting light therefrom; and removing that part of the mixture of materials not forming part of the structures;

wherein the non-photopolymerizable material is selected from the group consisting of 4'-pentyl-4-biphenylcarbonitrile and polystyrene.

2. The method of claim 1, wherein the irradiation is a UV light.

3. The method of claim 1, wherein the first material includes a photopolymer.

4. The method of claim 1, wherein the selectively irradiating is performed with a photomask.

5. The method of claim 1, wherein the removing that part of the mixture of materials not forming part of the structures is performed by washing the mixture of materials on the carrier film with a solvent.

6. The method of claim 1, further comprising coating the structures with a transparent material having a refractive index different than a refractive index of the structures.

7. The method of claim 6, wherein the transparent material includes glass beads or polymeric particles.

8. The method of claim 6, wherein the refractive index of the transparent material differs from the refractive index of the structures by at least 0.005 after being selectively irradiated.

9. The method of claim 1, wherein the mixture of materials is degassed prior to coating on the carrier film.

10. The method of claim 1, wherein the first material is selected from the group consisting of ethoxylated (3) bisphenol diacrylate, ethoxylated (4) bisphenol diacrylate, trimethylolpropane triacrylate, propoxylated (2) neopentyl glycol diacrylate, 2(2-ethoxyethoxy) ethyl acrylate, epoxy acrylate and urethane acrylate.

11. The method of claim 1, wherein the mixture of materials includes a photoinitiator.

12. The method of claim 11, wherein the photoinitiator is selected from the group consisting of benzyl dimethyl ketal, 4-methylbenzophenone, trimethyl benzophenone, 2,2dimethoxy-1,2-diphenylethan-1-one, 1hydroxy-cyclohexyl-phenyl-ketone, amine coinitiator and 2,4,6-trimethyl-benzoyl-diphenyl-phosphineoxide.

13. The method of claim 1, further comprising, before the step of selectively irradiating the mixture of materials, adding to the mixture of materials a dye or pigment material.

14. The method of claim 6, wherein the transparent material is chosen from the group consisting of silicone, fluorinated acrylates, fluorinated methacrylates, fluoro epoxy, fluorosilicones, polysulfone, polyphenylsulfone and polyethersulfone.

15. A method of making a diffuser comprising:

coating a mixture of materials on a carrier film, the mixture of materials including at least a first material that polymerizes upon irradiation and at least a non-photopolymerizable second material that phase separates from the at least first material when the at least first material polymerizes;

selectively irradiating, using a photomask, the mixture of materials to polymerize a portion of the mixture of materials to form polymerized light diffusing protruded structures having optically rough pitted rugged surfaces for emitting light therefrom;

removing that part of the mixture of materials not forming part of the structures; and coating the structures with a transparent material having a refractive index different than a refractive index of the structures;

wherein the non-photopolymerizable material is selected from the group consisting of 4'-pentyl-4-biphenylcarbonitrile and polystyrene.

16. The method of claim 15, wherein the transparent material includes glass beads or polymeric particles.

* * * * *